United States Patent [19]

Oestreich

[11] 4,386,496
[45] Jun. 7, 1983

[54] DEVICE FOR SZ STRANDING OF ELEMENTS INTO UNITS AND BUNDLES OF UNITS

[75] Inventor: Ulrich Oestreich, Munich, Fed. Rep. of Germany

[73] Assignee: Siemens Aktiengesellschaft, Berlin & Munich, Fed. Rep. of Germany

[21] Appl. No.: 229,170

[22] Filed: Jan. 28, 1981

[30] Foreign Application Priority Data

Feb. 18, 1980 [DE] Fed. Rep. of Germany ....... 3006054

[51] Int. Cl.³ ............................................ H01B 13/02
[52] U.S. Cl. .......................................... 57/293; 57/352
[58] Field of Search ........................... 57/293, 294, 352

[56] References Cited

U.S. PATENT DOCUMENTS 3,847,190 11/1974 Forester ............................ 57/293 X
4,056,925 11/1977 Vogelsberg ........................... 57/293

FOREIGN PATENT DOCUMENTS 2255419 5/1974 Fed. Rep. of Germany.

*Primary Examiner*—John Petrakes
*Attorney, Agent, or Firm*—Hill, Van Santen, Steadman, Chiara & Simpson

[57] ABSTRACT

A device for SZ stranding of a plurality of elements, particularly light waveguides or symmetrical elements such as quads into a stranded unit and then stranding the units into a bundle of stranded units, said device having a plurality of store devices in which the elements are brought into the stranded units and a common stranding nipple having an aperture with an inlet for receiving the units and stranding the units into a bundle characterized by each of the plurality of store devices being a pipe-like store having means for rotating the pipe-like store in both directions about its axis, each of said pipe-like stores on one end being provided with a stranding disc having axially extending apertures for each of the stranding elements being handled by the pipe-like store, said pipe-like stores being positioned in a star-like pattern converging towards one another with their respective one ends terminating as close as possible to the inlet of the common stranding nipple so that the stranding point of the elements of each store substantially coincides with the point for stranding the units into a bundle of stranding units in the stranding nipple.

11 Claims, 3 Drawing Figures

DEVICE FOR SZ STRANDING OF ELEMENTS INTO UNITS AND BUNDLES OF UNITS

BACKGROUND OF THE INVENTION

The present invention is directed to a device for SZ stranding of a plurality of elements particularly light waveguides or symmetrical elements for example quads into a unit of stranded elements which device utilizes a plurality of store devices for stranding the elements which are then brought together as a common stranding nipple as a bundle of units.

A stranding method which has a first stranding stage in which elements are stranded into units with the direction of twist alternating to produce a SZ stranding pattern is disclosed in German O.S. 22 55 419. These stranded units are formed by the method of the German O.S. and are then stranded into a group or bundles of stranding units in a second stranding stage. To this end, the stranded units produced in the first stranding stage are supplied to a stranding nipple shared by all of the stranding units or stores wherein a respectively rotating stranding head is disposed in the direct proximity of the common stranding nipple and the stranding head surrounding the respective stranding unit is circumferentially directed in a non-positive lock. Each stranding head exerts a torsion on the respective unit by means of an appropriate selection of the speed and direction of rotation to such a degree that the unit of stranded elements exhibits a constant stranding direction along their path to the stranding nipple. By so doing, it is guaranteed that the unit of stranded elements cannot unravel at the reversing location at the point of reversing the direction of twist of the unit formed later on by the device as the unit proceeds from the first stranding stage to the second stranding stage. To this end, the stranding heads are arranged directly in front of the stranding nipple in order to guarantee the shortest possible path between the stranding heads to the stranding nipple. The stranding heads produced temporary and final stranding all of which are connected with a corresponding elastic-plastic torsion as a result of a lack of a back twist. Since the twister arrangement, which is employed is long and the twisters are voluminous in size, a connection of the point for stranding the units into a bundle to the previous point for stranding the elements into a unit is much more difficult.

SUMMARY OF THE INVENTION

The present invention is directed to providing a device which simply guarantees a forced back twist on the elements and thus avoids a mechanical overload of the elements being stranded and the device is provided with a short and compact structure while at the same time produces a very regular stranding with short reversing locations which can no longer be disrupted before the units of stranded elements are stranded into the basic bundle. The solutions, which are provided by this device, are particularly useful in stranding of symmetrical elements and in stranding a light waveguide. The device of the present invention also provides the structure which is designed as simply as possible.

Accordingly, the invention is directed to an improvement in a device for SZ stranding of a plurality of elements, particularly light waveguides and symmetrical elements such as quads, into separate stranded units and then stranding the units into a bundle of stranded units, said device having a plurality of store devices in which the elements are brought into units of stranded elements and have a common stranding nipple with an aperture with an inlet for receiving the units and stranding the units into a bundle. The improvement comprises each of the plurality of store devices being a pipe-like store having means for rotating the pipe-like store in both directions about its axis, each of the pipe-like stores being provided with a stranding disc having an axially extending aperture for each of the elements being handled by the pipe-like store, said stranding disc being mechanically connected at one end of the pipe-like store to rotate therewith so that the elements moving along the store are arranged in the desired pattern and provided with a twist with a desired back twist, said plurality of pipe-like stores being positioned in a star-like pattern converging towards one another with the respective one end terminating as close as possible to the inlet of the common stranding nipple so that the point for stranding the elements into a unit for each store substantially coincides with the point for stranding the units into a bundle of stranded units in said stranding nipple.

The device may include means arranged at the intake side of the stranding nipple to form individual guidance bores for the unit of stranded elements entering the nipple.

The unit may include a guide point which is disposed in front of the inlet of the stranding nipple. The guide point spaces the points for stranding of the elements of each pipe-like store immediately in front of the point for stranding the units into the bundle of stranded units. The guide point is preferably coaxially arranged in the aperture of the stranding nipple and has an exterior surface of a contour matching the contour of the surface of the inlet of the stranding nipple so that at least a portion of the surfaces of the nipple and the inlet are of equal distance apart and extends parallel to each other. The nipple and the inlet may be constructed to provide means for individually guiding each of the units of stranded elements entering the nipple and this means for individually guiding may be either a partition for each unit extending radially outward from the axis of the guide point or part in a star-shaped pattern or may be due to specific shaping of the surfaces which coact to form a bore or aperture like guiding portions disposed between the inlet of the nipple and the guide point.

The device may include means for applying a retaining spiral on the bundle of units as they pass through the stranding nipple and this means for applying includes a central spinner means discharging the strand of the spiral at the inlet to the nipple so that the retaining spiral is applied as the elements are stranded into the units and the units are stranded into the bundle of units.

DESCRIPTION OF THE PREFERRED EMBODIMENTS

Figure 1:
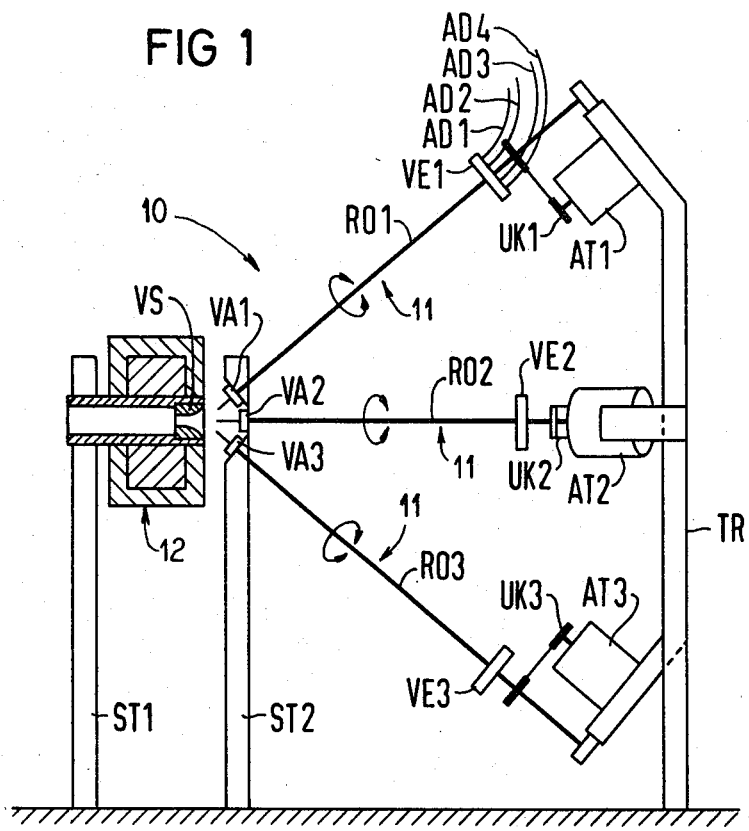
FIG. 1 is a schematic illustration of the basic structure of the device in accordance with the present invention.

The principles of the present invention are particularly useful in a device generally indicated at 10 in FIG. 1. The device 10 in first stranding stages 11 strands a plurality of elements such as AD1–AD4 into a unit of stranded elements and then in a second stranding stage 12 strands the units of stranded elements with other units into a bundle or group of stranded units.

The device 10 is designed with five first stages 11 to form five quads or units into a bundle with a five star configuration. The device 10 is provided with support frames TR and ST2 for supporting the five cylindrical stores of the first stage. However, in the drawings and for purposes of illustration only three stores are shown in the figures. Each of the stores is provided with means for rotating the store about its longitudinal axis in either of two rotational directions. Each of the means for rotating includes a drive device AT1, AT2, AT3, which are a single motor which is provided with a corresponding reversible coupling UK1, UK2, UK3. The cylindrical stores are each designated as pipe-like stores RO1, RO2, RO3 and are connected in driving relation with the reversible couplings by a drive connection such as formed by a tooth belt.

If the device 10 is working with a pull off speed of 200 rpm, has a 10 cm length for the lay and a maximum of five lays in each store, which would be ten lays between two reversing locations, the reversing couplings such as UK1, UK2, UK3 must respectively reverse the pipe stores RO1, RO2, RO3 from a −2000 RPM to a +2000 RPM for example two hundred times per minute. Thus, only 10 ms at the most are available for the reversing operation. Since the moment of inertia of the store is formed only by the tooth belt, the tooth wheel of the coupling such as UK, the pipe store RO and the stranding disc associated therewith, it is possible to have corresponding rapid reversing operations following one after another.

The overall length of the system or device illustrated in FIG. 1 can amount to approximately 0.7 meters. Each of the pipe stores RO is respectively approximately 0.5 m long and the pipe diameter is approximately 0.5 cm.

Each of the stores RO1, RO2 and RO3 is provided with a first or inlet stranding disc VE1, VE2, VE3, respectively at the entrance of the store. Each of the inlet discs such as VE1 (FIG. 2) is provided with an axially extending aperture AE for each of the elements or individual leads such as AD1–AD4. Thus, since four elements are being supplied to each of the stores such as RO1, the disc VE1 has four apertures AE1–AE4 however only AE1 and AE4 are illustrated. It should be noted that the disc VE1 is mounted stationarily in the frame and is provided with a roller bearing so that the store such as RO1 may rotate relative thereto.

The opposite end of each of the stores such as RO1 is provided with a second or outlet stranding disc VA1 which is rigidly connected to the opposite or one end to rotate therewith. Each of the stranding discs VA1–VA3 is provided with an axially extending aperture through which the elements being stranded pass. As illustrated, the disc VA1 in FIG. 2 has apertures AV1 and AV4 while the other two are not illustrated. Each outlet disc VA is provided with a bearing which supports the disc and the one end of the pipe-like store RO in the frame such as the member ST2.

Referring back to the FIGS. 1 and 3, the device 10 is to produce a star-quad in which five units are bundled together and the device has five pipe-like or rod-like stores RO1–RO5. The elements which are to be stranded by each store are fed through the respective inlet stranding disc VE at the intake of the cylindrical pipe store to pass along the surface of the pipe store and exit through the outlet stranding disc VA at the exit end or one end of the store. The elements which are laid in an SZ pattern are supplied through the stranding disc VA of each of the stores to a common stranding nipple VS whose aperture is selected in such a manner that the units of stranded elements formed by each of the five stranding stores or stages are permanently held together. The stranding nipple VS is held outside of the pipe store frame by a member ST1 and differs from a normal stranding nipple in that the stranding nipple of the elements into quads or units and the quads and units into the basic bundles of quads or units as well as the fixing of the basic bundle by means of a retaining spiral occur simultaneously in the nipple. In order to facilitate this, a guide cone or point FS having an outer surface, which is both a surface of rotation and symmetrical, can be arranged in front of the inlet of the common nipple VS.

Figure 3:
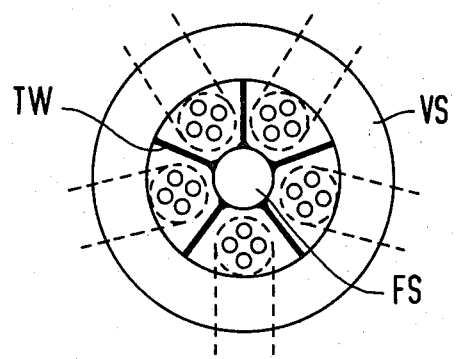
FIG. 3 is an end view looking into the intake of the aperture of the stranding nipple of the present invention.
Figure 2:
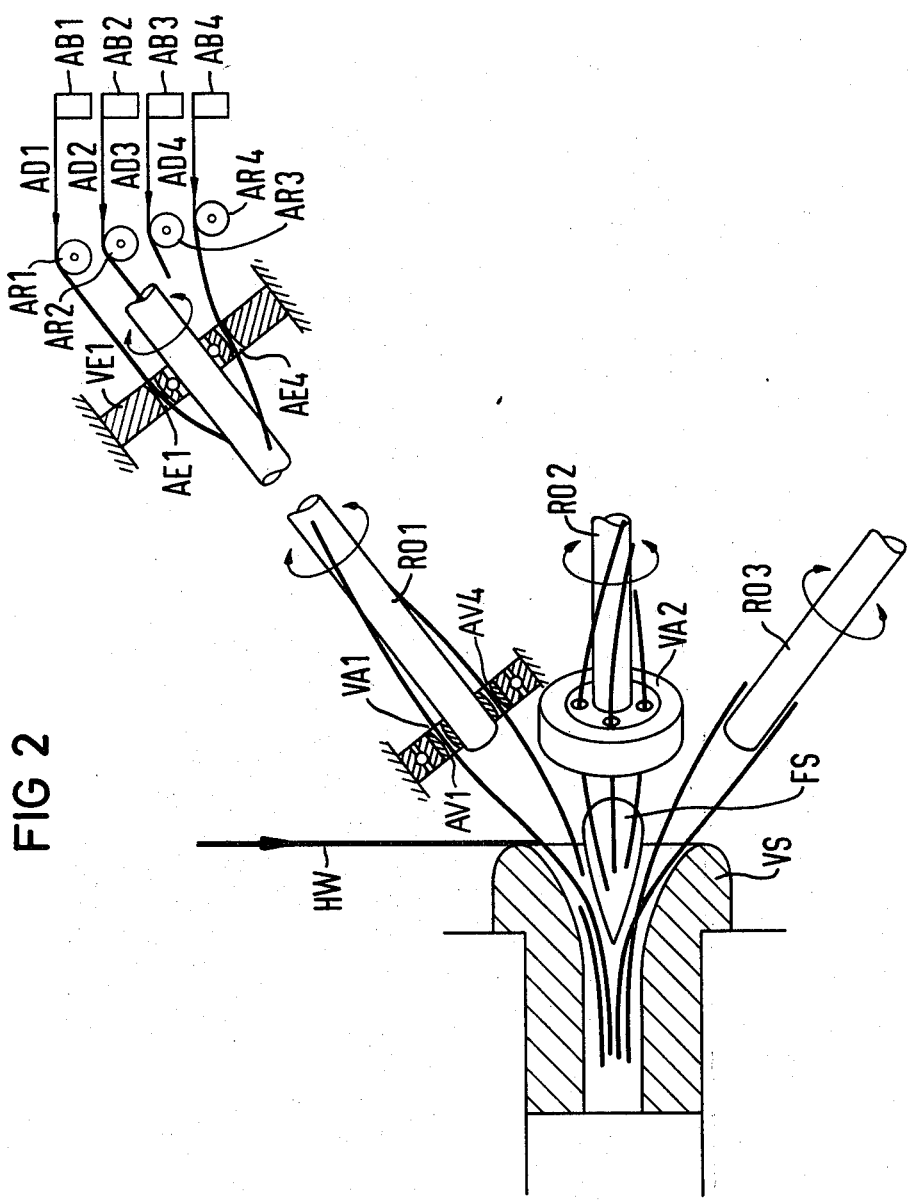
FIG. 2 is a schematic presentation showing details of the device of the present invention.

The guide cone FS (FIGS. 2 and 3) is positioned adjacent the inlet on the side of the pipe stores and is designed in such a manner that it causes a formation of the quad or unit at a point which is immediately in front of the point in which the quads or units are stranded into a bundle or group. The cone FS as illustrated in FIG. 2 may have means to physically guide each of the units and bundles entering the inlet of the nozzle, this means, as illustrated in FIG. 3, is formed by a partition TW for each of the bundles which partitions extend radially outward in a star-like pattern. The partitions may be joined to the inlet of the nipple in such a manner that five round single nipples or apertures are formed at the entrance and extend into the common nipple which forms at the entrance and extend into the common nipple which forms the units into the bundle of stranded units. In the case with the five bores or apertures, the simultaneous application of a retaining spiral is eliminated. It is noted in the above mentioned example, each of the basic bundles of stranded units likewise has the units stranded in an SZ pattern. Usually a long lay stranding is employed but this is not compulsory.

The device 10 provides a very svelte structure for the stranding of the elements into units and then subsequently into the group. Due to the star-like arrangement of each of the rod-like or pipe stores, the size and the exit ends of the stores is only limited by the radial dimension of the respective outlet stranding disc such as VA1 through VA5. It is expedient to dispose these stranding discs VA1 through VA5 in the closest possible proximity in front of the inlet of the aperture for the common stranding nipple VS so that the individual stranding disc VA1 through VA5 lie essentially and approximately on a calotte shell. They can be spatially arranged in the greatest possible proximity to one another and in such a manner that they nearly abut one another with their outside bearing races which are stationary in the structure.

Any of the further known stranding devices can be provided at the output of the common stranding nipple VS and all types of stranding are possible. For example, long lay stranding, SZ stranding in bundle or ply form are also possible.

As illustrated in FIG. 2, the lead such as AD1, AD2, AD3 and AD4, which are to be stranded in the pipe-like store RO1 are removed from their corresponding play-off reels or drums AB1 through AB4. The strands are then passed over one or more capstans or respectively deflection rollers such as R1, R2, R3 and R4 and arrive at the inlet stranding disc $V_1$ which acts as an input side distribution disc. As illustrated, the distribution disc $V_1$ has four axial apertures AE1 through AE4 and is stationary with respect to the pipe-like store RO1, which is coaxially supported by a ball bearing, in a centrally disposed aperture of the disc. The inside race of the ball bearing is rigidly connected to the pipe store. The other four pipe stores of the arrangement have a similar inlet construction.

Depending on the pull-off speed and the frequency of reversal sequences of the pipe store RO1, the individual leads AD1 through AD4 are stranded into an SZ arrangement with one another behind the pipe store. The outlet stranding disc VA1 at the one end or the output end of the store has four axial extending bores AV-1–AV4. The disc VA1 unlike the disc VE1 is rigidly connected to the one end of the pipe store RO1 and rotates therewith. Thus, the elements such as AD-1–AD4 which extends through the apertures AV1 through AV4 will also carry out the reversing operation of the pipe store. The ball bearing is provided on the outer annular edge of the disc VA1 and the outer ring or race of the ball bearing is firmly supported in a support frame or the like. The support frame as mentioned hereinabove has a form or a configuration approximately producing a calotte shell in which the individual outlet stranding disc VA1–VA5 lie in the closest proximity to each other and as close as possible to the inlet of the aperture of the stranding nipple VS. The inlet of the stranding nipple VS has a somewhat conical configuration with an aperture angle that corresponds to the oblique position of the various pipe stores RO1 through RO5. Thus, the store devices are spatially arranged in a star-like pattern and the stranding point for the elements being stranded in each of the stores as well as the point for stranding the units or bundles will substantially coincide in the aperture of the nipple VS.

Expediently, a retaining spiral such as HW can be applied to the stranded groups directly in front of these inlets of the stranding nipple VS in a conventional manner by mean for applying which includes a central spinner. The material for forming the retaining spiral HW is withdrawn from a concentrically suspended cop and is spun onto the stranded group in a stranded manner.

If the given stranded groups, are not sufficiently stable, for example, a group composed of five stranded units, it can be expedient to provide a guide point of need FS projecting into the inlet of the stranding nipple. The guide point will improve and provide the highest possible degree of symmetry. The outer contour of the guide point is approximately shaped in a matching relationship to the contour of the conical inlet of the stranding nipple so that the surfaces of the point and the conical inlet are equally spaced for at least an axial portion when the guide point is coaxially arranged on the longitudinal axis of the aperture of the stranding nipple. In the illustrated embodiment of the device or machine 10, the portion of the machine up to the stranding nipple, which portion is the first stage 11, can be held to less than one meter long and less than 1.5 meter wide. Thus, the dimensions of this portion of the machine will fit the remaining portion of the stranding machine which is not illustrated.

Above all, the invention allows processing a particular sensitive stranding element for example coaxial cables or light waveguides. Paper insulated conductors are likewise be stranded because far lower stresses of the insulation and conductors occur. Contrasting to a small reversal location interval, there are very short reversing locations which moreover change their spacing proportional to the length of the lay.

Although various minor modifications may be suggested by those versed in the art, it should be understood that I wish to embody within the scope of the patent granted hereon all such modifications as reasonably and properly come within the scope of my contribution to the art.

I claim:

1. In a device for SZ stranding of a plurality of elements, particularly light waveguides and symmetrical elements such as quads, into separate units and then stranding the units into a bundle of stranded units, said device having a plurality of store devices in which the elements are brought into stranded units and a common stranding nipple having an aperture with an inlet for receiving the units and stranding the units into a bundle, the improvement comprising each of the plurality of store devices being a pipe-like store having means for rotating the pipe-like store in both directions about its axis, each of said pipe-like stores being provided with a stranding disc having an axially extending aperture for each of the elements being handled by the pipe-like store, said stranding disc being mechanically connected at one end of the pipe-like store to rotate therewith so that the elements moving along the store are arranged in a desired pattern and provided with a desired back twist, said plurality of pipe-like stores being positioned in a star-like pattern converging towards one another with their respective one end terminating as close as possible to the inlet of the common stranding nipple so that the point for stranding the elements into a unit for each store substantially coincides with the point for stranding the units in a bundle of stranded units in said stranding nipple.

2. In a device according to claim 1, which includes a guide point being disposed in front of the inlet of the stranding nipple, said guide point spacing the points for stranding the elements of each pipe-like store immediately in front of the point for stranding the units into the bundle of stranded units.

3. In a device according to claim 2, wherein the guide point is arranged coaxially to the aperture of the stranding nipple, said guide point having an exterior surface of a contour matching the contour of the surface of the inlet of the stranding nipple.

4. In a device according to claim 3, wherein the guide point is provided with means for individually guiding each of the units entering the nipple, said means for guiding including a partition for each unit extending radially outward from the axis of the guide point in a star-shaped pattern.

5. In a device according to claim 3, wherein the coaxial guide point and the stranding nipple coact to form means for individually guiding each of the units of stranded elements entering said nipple.

6. In a device according to claim 2, wherein the guide point is provided with means for guiding each of the units entering the nipple, said means including a partition for each of the stranded units entering the nipple, said partitions being arranged in a star-shaped pattern radiating from the axis of the guide point.

7. In a device according to claim 2, wherein the inlet of the stranding nipple and the guide point are configured to form means for individually guiding each of the units of elements entering the stranding nipple.

8. In a device according to claim 1, which includes means for applying a retaining spiral on the bundle of units as they pass through the stranding nipple, said means for applying including a central spinner means discharging at the inlet to said nipple.

9. In a device according to claim 8, which includes a guide point being arranged at the inlet of the stranding nipple, said guide point coacting with the inlet of the stranding nipple to position the points for stranding the elements into units in front of the point for the stranding of the units into a stranded bundle of units.

10. In a device according to claim 9, wherein the guide point is coaxially aligned with the axis of the stranding nipple, said guide point having an outside surface with a contour matching the contour of the surface of the inlet of the stranding nipple so that at least an axial portion of the surfaces are of equal distances.

11. In a device according to claim 1, which includes means arranged at the intake side of the stranding nipple to form individual guidance bores for the units of stranded elements entering said nipple.

* * * * *